May 31, 1932.  P. J. O. MILLER  1,860,427
SIGNALING DEVICE
Filed Aug. 17, 1928
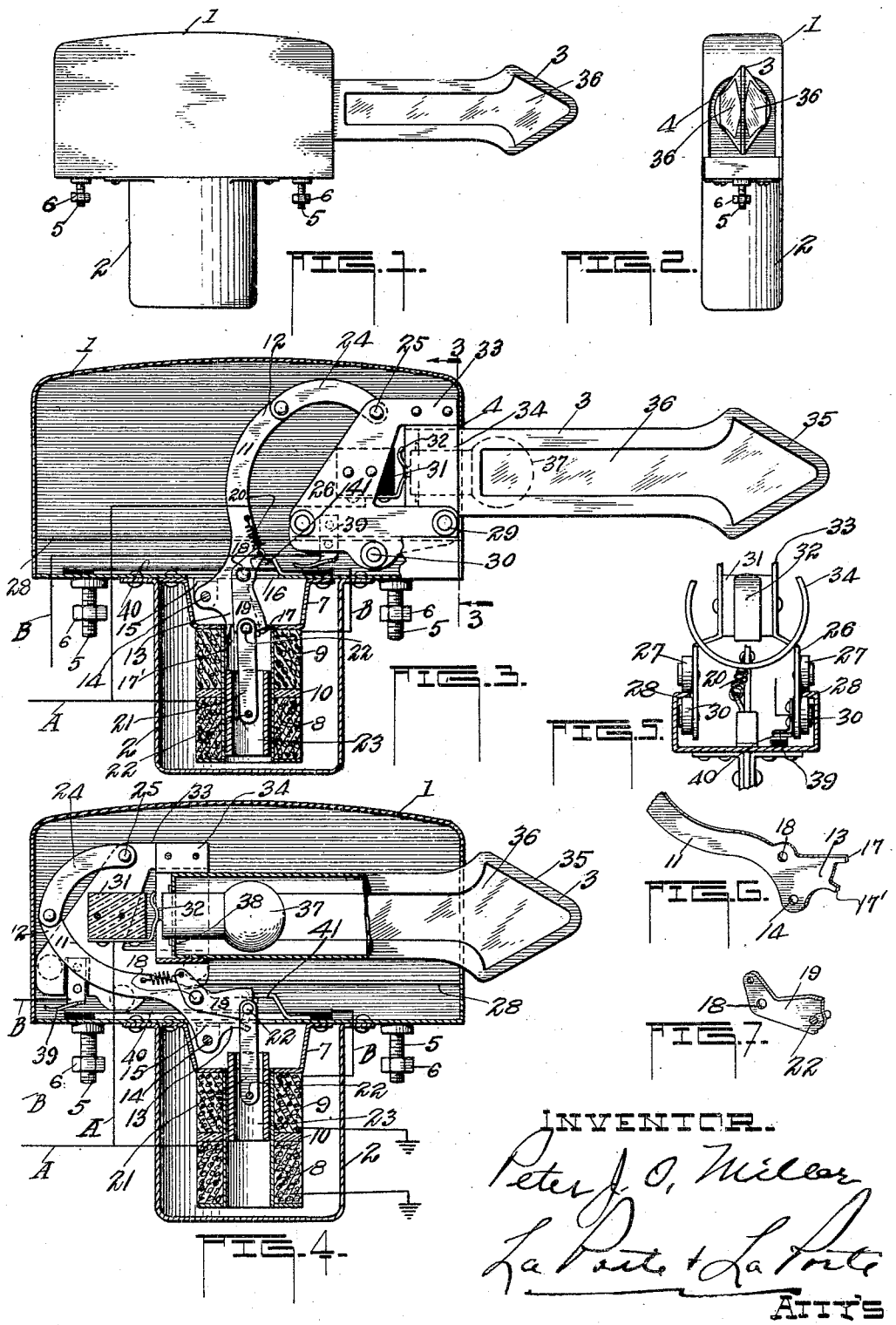

Patented May 31, 1932

1,860,427

UNITED STATES PATENT OFFICE

PETER J. O. MILLER, OF PEORIA, ILLINOIS, ASSIGNOR OF ONE-HALF TO ELMER E. NYSTROM, OF PEORIA, ILLINOIS

SIGNALING DEVICE

Application filed August 17, 1928. Serial No. 300,314.

This invention has reference to signaling devices adapted for attachment and operation upon preferably motor driven vehicles such as automobiles and trucks.

The invention has for its principal object to provide a signaling device for vehicles adapted for indicating and giving warning to operators of other vehicles or to pedestrians when a change in the direction of progressive movement had by such vehicle is about to be made, whereby accidents can be avoided and the driving of the vehicle rendered more safe.

The invention has for a further object to provide in a signaling device for attachment and operation upon vehicles, a direction indicator or arm adapted when projected from either or both sides of the vehicle to be illuminated by means of an electric bulb or lamp carried by said indicator or arm, whereby operators of other vehicles and pedestrians within visual range of such illuminated warning may be informed of a proposed change in movement of the vehicle, especially during rainy or foggy weather and particularly at night.

A further object of the invention is to provide a device of the character above referred to which shall be simple and efficient in operation, cheap in manufacture and compact in its arrangement of parts, and further, so constructed as to enable quick examination and change of parts for repairs, when necessary.

That the invention may be more fully understood, reference is had to the accompanying drawings forming a part of this description and illustrating a preferred embodiment of the invention, in which:—

Fig. 1 is a view in elevation of my improved signaling device showing the signal arm or warning indicator thereof projected into signaling or warning position;

Fig. 2 is an end view of Fig. 1;

Fig. 3 is an enlarged view of Fig. 1 disclosing in section the operating mechanism of the device and electrical wiring arrangement therefor;

Fig. 4 is a view similar to Fig. 3 except the signal arm or warning indicator is shown in retracted or non-signaling position;

Fig. 5 is a spot view of the signaling arm or indicator carriage, as the same would appear if taken on the line 3—3, Fig. 3;

Fig. 6 is a perspective view of the forked end portion of the curved lever, one of the operating mechanisms of the signaling device, and Fig. 7 is a perspective view of the locking plate and pin which coact with the curved lever shown in Fig. 6.

Like characters of reference denote corresponding parts throughout the figures.

Reference being had to the drawings, my improved signaling device consists of a compact unit comprising superimposed upper and lower compartments or casings 1 and 2 respectively, the upper compartment 1 being a housing for a signal arm 3 which is adapted to be projected into and out of said compartment 1 through an end opening 4. Depending stub bolts 5 with nuts 6 are provided on opposite lower ends of the casing or compartment 1 to enable the signaling device to be attached or supported to suitable locations on motor vehicles, such as automobiles and trucks.

Contained within the lower compartment or casing 2 and supported from the floor of the casing 1 by means of a bracket 7 are solenoid coils 8 and 9 arranged in vertical alignment with each other and insulated from each other by means of an insulator or a non-conductor 10. A lever member 11 having a curved end portion 12 and a forked end portion 13 is pivotally mounted at 14 from a depending lug 15 supported from the floor of the casing 1, said lever member 11 extending through an opening or cut-out portion 16 of the floor of the casing 1 to enable the curved end portion 12 to have swinging movement within the casing or compartment 1 and the forked end portion 13 to have a swinging movement within the casing or compartment 2. The forked end portion 13 of the lever member 11 is cut away or slotted to form fingers or stops 17 and 17'. Offset from the pivot point 14 of the lever member 11 is a pivot point 18, see Figs. 3 and 6, at which point is pivotally connected an angularly shaped lock member or plate 19, see Figs. 3 and 7, one end of which is connected to a portion of the lever member 11 by means of a coiled spring 20, the other end having a pivotal connection with a connecting link 21 by means of a connecting pin 22, which will be understood to coact with the forked end portion 13 of the lever arm 11 between the fingers or stops 17 and 17'. The opposite end of the connecting link 21 is pivotally connected at 22 to a solenoid core or piston 23 which is adapted to have movement within the solenoid coils 8 and 9, to be described.

Pivotally connected to the curved end 12 of the lever member 11 is a curved link member 24 which is adapted to have a pivotal connection at 25 with a movable carriage 26. Said carriage 26 is provided with two sets of opposed rollers or wheels 27 which are adapted to ride on rails 28 provided on the inside faces of the walls of the casing or compartment 1 to permit longitudinal movement of the carriage 26 within said casing or compartment 1. The sets of rollers or wheels 27 are preferably comprised of upper and lower rollers or wheels 29 and 30 respectively, to engage the upper and lower faces of the rails 28 to prevent rocking of the carriage upon the rails and to insure easy riding of the same thereon. Suitably supported within the carriage 26 is an insulation block 31 to which is attached an electrical contact finger 32. The carriage 26 is formed with horizontally extending arm portions 33, see Figs. 3 and 4, to which is suitably connected a depending ring or band 34 of considerable width which serves as a seat or holder for a horizontally disposed signal arm or projector 3 which is adapted to have a frictional engagement with the ring or band 34. The signal arm 3 is an elongated hollow member, its frame being preferably made of metal and its free end is shown tapered at 35 to resemble the point of an arrow, for ornamental purposes, however, it is obvious that the shape and formation of the signal arm may be otherwise as conditions and manufacturing policies might dictate. The greater body porton of the signal arm 3 is preferably transparent by the use of either glass or mica designated 36 so that when the light bulb or lamp 37 which is adapted to be inserted and retained in the inner end 38 of the signal arm 3 is lighted and the signal arm extended or projected in the manner shown in Fig. 3, it will be understood that by reason of the transparent portions of the signal arm, such illuminated signal arm will serve as a warning to other vehicles and pedestrians that a change in the direction of progressive movement had by such vehicle is about to be made. It will be understood that when the signal arm 3 is frictionally retained in the ring or band 34 having the lamp bulb 37 suitably secured in the signal arm at 38 that the contact portion of the lamp 37 is adapted to have frictional contact with the electrical contact finger 32, see Figs. 3 and 4.

Suitably attached to and insulated from the carriage 26 is a projecting contact finger 39 which is adapted during the longitudinal movement of the carriage 26 within the casing or compartment 1 to have contact with a conductor or contact strip 40 secured preferably to the floor of the compartment or casing 1, said strip 40 being suitably insulated therefrom, see Figs. 3, 4 and 5.

The electrical wiring arrangement for the device is as follows: A conductor or line A, see Figs. 3 and 4, having as a source of power preferably a battery usually carried by all motor vehicles, is shown leading to the solenoid 8 within the compartment or casing 2 and also leading within the compartment 1 and connecting to the electrical contact finger 32. A conductor or line B, having the same source of power as the line A, is shown leading within the compartment or casing 1 and connecting to the insulated projecting contact finger 39, which is carried by the carriage 26, said conductor or line B forming a part of the conductor or contact strip 40 and leading therefrom into compartment 2 and connected to the solenoid 9. Each of the solenoids is grounded as shown in Fig. 4. Interposed between the source of power, such as an electric battery, not shown, and the signaling device in the lines A and B, a suitable electric switch, not shown, would be provided whereby the operator of the vehicle would operate the signaling device by actuating the switch to cause an electric current to pass through the line A and into the solenoid 8, which line and solenoid causes the signal arm 3 to be projected into signaling position simultaneously lighting the lamp or bulb 37, as illustrated in Fig. 3, and upon the operator actuating the switch to close the circuit into the line B and causing an electric current to pass into the line B and solenoid 9, it will be understood that the line B and the solenoid 9 is the circuit for returning the signal arm 3 to its normal inoperative or non-signaling position, as shown in Fig. 4.

In the operation of the signaling device and assuming the signal arm 3 to be in inoperative or non-signaling position, as shown in Fig. 4, it will be understood that upon passing an electric current through the line A that simultaneously the solenoid 8 will be energized and the lamp or bulb 37 will be illuminated by reason of the electrical contact finger 32. The energizing of the solenoid 8 causes the core or piston 23 to be attracted or pulled downwardly within the core of the solenoid 8 and carrying with it the connecting link 21, which downward movement results in the connecting pin 22 of the link 21 and the locking member or plate 19 to bear against the projecting finger 17' of the forked end portion 13 of the lever member 11 causing the lever member 11 to swing on its pivot 14 and the connecting link 24 to thrust the carriage 26 and illuminated signal arm 3 carried thereby upon the rails 28 into signaling or warning position as shown in Fig. 3. The outward movement of the signal arm 3 from the casing or compartment 1 into signaling or warning position is limited by the engagement or abutting of an edge of the lever member 11 against a stop member 41.

As shown in Fig. 4, when the arm 3 is in its retracted position within the casing, the locking member 19 is engaged with the free end of the stop 41 and is so held by the spring 22, whereby the arm 3 is held latched or locked within the casing.

To return the signal arm 3 from the position shown in Fig. 3 to inoperative or non-signaling position as shown in Fig. 4, it will appear obvious that the current in the line A is shut off by means of a suitable switch, not shown, de-energizing the solenoid 8 and closing the circuit which lights the lamp or bulb 37, and that an electric current is passed through the line B which energizes the solenoid 9 by reason of the projecting contact finger 39 carried by the carriage 26 which in signaling position has contact with a conductor or contact strip 40 which is connected by the conductor or line B which carries the electric current to the solenoid 9 and energizes the same resulting in attracting or causing the upward movement of the core or piston 23. The upward travel of the core or piston 23 from the solenoid 8 to the solenoid 9 will be understood to cause the pin 22 connecting the link 21 and the locking member or plate 19 to abut against the forked end portion 13 of the lever member 11 and engage in its upper travel with the finger 17 resulting in a swinging movement of the lever member 11 on its pivot 14 and returning the carriage 26 and signal arm 3 by means of the link member 24 on the rails 28 to inoperative or non-signaling position as shown in Fig. 4. The return movement of the carriage 26 and the signal arm 3 within the casing or compartment 1 is limited by the engagement of the finger 17 abutting or engaging against the stop member 41. The electric current in the line B to the solenoid 9 is broken or shut off during the return of the signal arm 3 to inoperative or non-signaling position when the contact finger 39 disengages from the conductor or contact strip 40, as shown in Fig. 4.

What is claimed is:—

In a signal indicator, in combination, a casing having an opening in one end and with aligned tracks extending longitudinally on opposite sides thereof, a carriage movable on said tracks, an indicating arm connecting with the carriage and projecting and having movement through the opening in said casing, a lever pivoted to the casing near one end and connected with the carriage by means of a link pivotally connected with the carriage and with the lever, an operating means located below the casing, an operating connection between the lever and said operating means including an arm having a pivotal connection with the lever and means arranged for coaction with the lever for limiting the movement of the latter on the projection and withdrawal of the signal arm to the limits of its movements.

In witness whereof, I have hereunto affixed my hand this 11th day of August, 1928.

PETER J. O. MILLER.